United States Patent [19]

Lock et al.

[11] Patent Number: 4,781,255
[45] Date of Patent: Nov. 1, 1988

[54] CABLE CONDUIT SYSTEM FOR VEHICLES

[75] Inventors: Stanley A. Lock, Bristol; Brian E. Mills, Surrey, both of England

[73] Assignee: British Aerospace Public Limited Company, London, England

[21] Appl. No.: 805,630

[22] Filed: Dec. 6, 1985

[30] Foreign Application Priority Data

Dec. 8, 1984 [GB] United Kingdom ............... 8431067

[51] Int. Cl.$^4$ .............................................. H02G 3/04
[52] U.S. Cl. .................................. 174/97; 138/115; 174/72 A; 248/68.1; 248/507
[58] Field of Search ............... 174/68 C, 70 C, 72 C, 174/72 A, 95, 97; 138/108, 115, 116, 117; 248/68.1, 507, 508, 49; 244/1 R, 129.1; 280/782; 296/208; 361/428

[56] References Cited

U.S. PATENT DOCUMENTS

| | | | |
|---|---|---|---|
| 3,346,688 | 10/1967 | Fields | 174/68 C |
| 4,347,998 | 9/1982 | Loree | 138/115 X |
| 4,372,510 | 2/1983 | Skypala | 248/68.1 X |
| 4,395,009 | 7/1983 | Bormke | 248/68.1 |

FOREIGN PATENT DOCUMENTS

| | | | |
|---|---|---|---|
| 2226677 | 12/1973 | Fed. Rep. of Germany | 248/68.1 |
| 1158564 | 1/1958 | France | 174/68 C |
| 308834 | 6/1933 | Italy | 174/97 |
| 402555 | 12/1933 | United Kingdom | 138/117 |

Primary Examiner—Laramie E. Askin
Attorney, Agent, or Firm—Cushman, Darby & Cushman

[57] ABSTRACT

A conduit system for cables adapted for mounting in a vehicle including constant cross-sectional elongate conduit elements 1 having one or more channels 3 formed therein and retention and locking members for holding the cables within the or each channel at intervals along their lengths. The conduit system may comprise a plurality of straight conduit elements 1 connected end to end, for example in an aircraft fuselage. Alternatively, where a change of direction and/or elevation is necessary, the straight conduit elements may be interconnected by curved joining conduit elements 2.

3 Claims, 4 Drawing Sheets

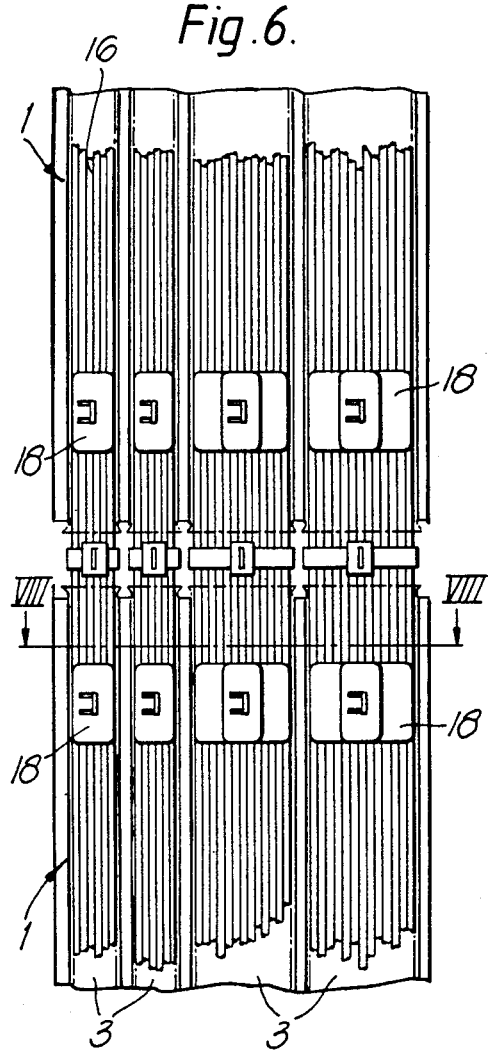
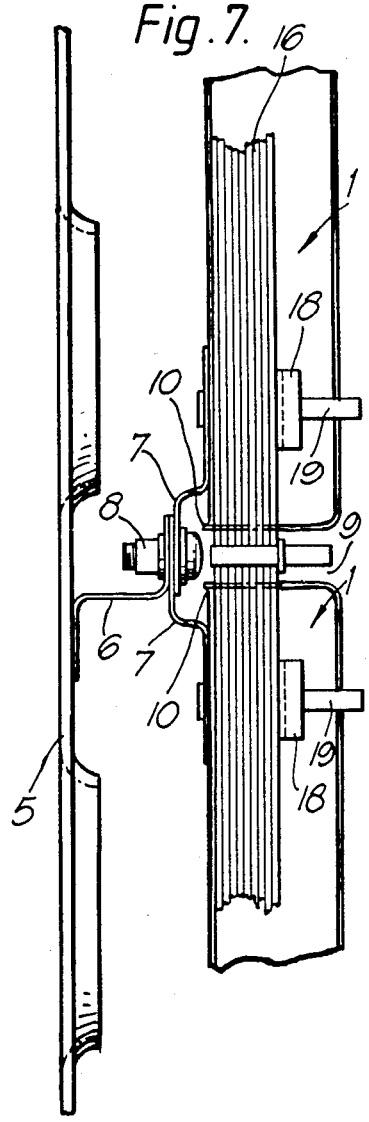
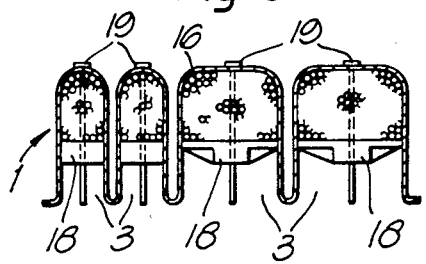

CABLE CONDUIT SYSTEM FOR VEHICLES

This invention relates to conduit systems for filamentary members such as electrical cables or light guides, which conduit systems are suitable for mounting in vehicles, particularly, but not exclusively, aircraft. For ease of description these filamentary members will henceforth be referred to as cables.

More and more cable runs and required in vehicles as technology grows. In aircraft for example, fly-by-wire and fly-by-light systems are becoming the norm both in military and civil projects. Similarly, in other vehicles electrical or light signalling is more and more usual.

In vehicles, particularly aircraft, there are problems of access to effect the installation of such cable runs both in original installations and in the installation of additional cable runs during the life of the vehicle, and for inspection of such runs during installation and subsequently. There are also problems of adverse electrical interaction between adjacent cable runs carrying different electrical signals, especially where the runs are forced closely together in congested areas. Additionally, where lightning strikes are possible, the system must be totally immune to the high transient voltages which can occur. Moreover, any possibility of damage to the cables during routine work on or adjacent the cable runs must be minimized. The present invention has for an objective the provision of a conduit system which goes some way to overcoming these listed problems in a relatively inexpensive and lightweight manner.

According to one aspect of the present invention a conduit system for cables adapted for mounting in a vehicle includes a constant cross section elongate conduit element having one or more channels formed therein and retention means for holding the cables within the or each channel at intervals along their lengths, each retention means comprising a retaining member dimensioned to be a pushfit within its associated channel and a locking member to ensure that once pushed into the channel into a cable holding position, the retaining member will stay in that position.

Preferably the conduit elements are of metal with an electrically insulating and friction reducing lining to the channel or channels.

Preferably each locking member comprises a serrated tie member anchored to the channel element in the region of the base of the channel and extending outwardly therefrom, and each retaining member comprises a block assembly having a hole through which the tie member extends and ratchet means engaging the serrations on the tie member. The block assembly may comprise a single block or it may comprise twin blocks, one providing a fairlead arrangement.

The conduit system may comprise a plurality of straight conduit elements connected end to end, for example in an aircraft fuselage, but where a change of direction and/or elevation is necessary, for example to clear structural obstacles in an aircraft wing, specially curved joing conduit elements are provided. Theses are formed with carefully chosen channel dimensions in cross section such that accurate transverse alignment with adjacent straight conduit elements is unnecessary.

Although in the preferred embodiment the conduit elements are of metal, non-metallic materials adapted to include electrically conductive pathway means may be utilized without in any way detracting from the spirit of the invention. For example, the non-metallic elements may be of a suitable moulded plastic material having a metallised surface of combining metallic particles or elements dispersed within the material in a manner to provide said electrically conductive pathway means.

It will be appreciated that the utilisation of non-metallic materials may be additionally beneficial since the individual conduit elements may be readily moulded and may accommodate necessary changes of direction and/or elevation thereby reducing the need for the provisioning of separate curved joining conduit elements, interconnecting attachment means and electrical continuity bonding between the adjoining elements. There may be additional benefit in terms of weight saving, which is a critical factor in aircraft structures.

Some embodiments of a conduit system suitable for mounting in an aircraft structure are described by way of example with reference to the accompanying drawings in which.

Figure 5:
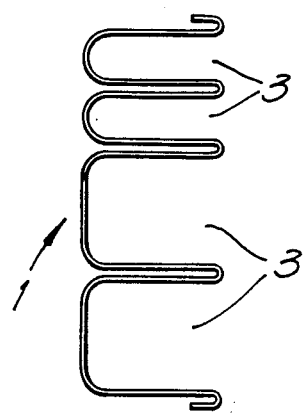
Figure 9:
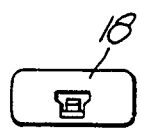
Figure 9A:
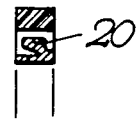
Figure 10:
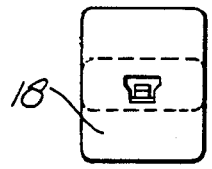
Figure 10A:
Figure 11:
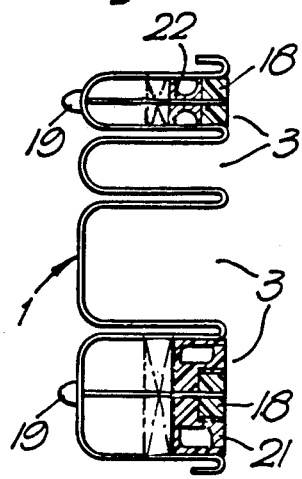
Figure 12:
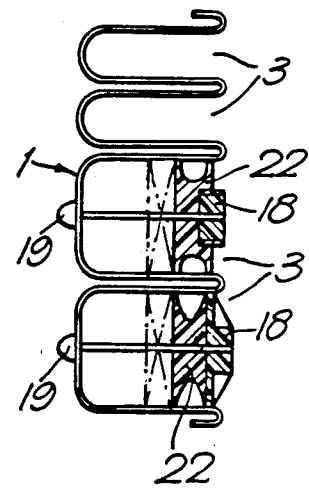

FIGS. 6, 7 and 8 are views in plan, elevation, and cross section, the cross section being taken from arrows VIII—VIII of FIG. 6, respectively, of a region of the conduit system loaded with cable and attached to an aircraft structure, FIGS. 9, 9A and 10, 10A are views showing small and large cable retaining members in both plan and cross section, FIG. 11 is a similar view of that of FIGS. 5 and 8 illustrating the incorporation of a fairlead arrangement, FIG. 12 is a similar view to that of FIG. 11 showing an alternative fairlead arrangement.

Figure 13:
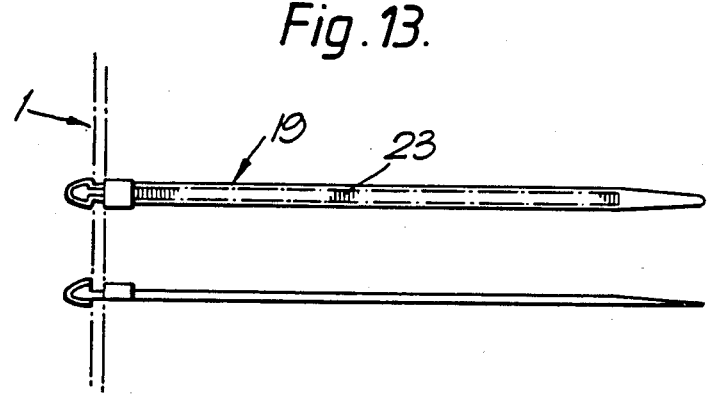

FIG. 13 illustrates a tie member, and

Figure 14:
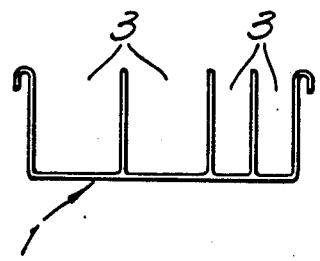

FIG. 14 illustrates a further typical conduit element as an alternative embodiment of this invention.

A conduit system basically comprises two types of conduit elements, namely, straight elements 1 and curved elements 2. These combine, when in end to end relationship, to form what can be described as a raceway within which lengths of filamentary signal carrying members such as electrical cables or light guides can be placed and retained. The straight elements 1 are formed of light alloy sheet pressed to provide the plurality of channels 3, each of which can be of different widths or each of which can be of constant width and depth. The interior of each channel 3 is coated with PTFE to give both insulation and low friction, the latter being necessary if cables are to be moved. The coating is also instrumental in the avoidance of chaffing.

The curved elements 2 are formed of precision cast light alloy with the same number of channels therein as the straight elements with which they will be associated in use. These channels, referenced 4, are again PTFE coated. The individual channels 4 are formed of slightly greater width than the individual channels 3 with which in use they will be in register; that is to say, their sidewalls are thinner. This means that precise lateral location between the straight elements and curved elements is unnecessary. Naturally, the end regions of the channels 3 and 4 are rounded so that no sharp edges are present to interfere with the cable runs. This is particularly important where the channels 3 and 4 are not in exact register; it is also important where, as in this embodiment, gaps are provided as a matter of design choice between successive elements of the raceway.

Referring now to FIGS. 6–8, and in particular to FIG. 7, a mounting arrangment for (a) connecting adjacent straight elements together, and (b) mounting said interconnected straight elements to an aircraft structure shown in FIG. 7 at reference 5 is illustrated. A Z-section bracket 6 is arranged to extend from the structure 5 and on the respective ends of the straight elements similar joggled interconnecting lugs 7 are arranged to extend rearwardly of the straight elements and are coupled one to another and to the bracket 6 by means of a nut and bolt arrangement 8. Naturally, the shape of the bracket 6 is a matter of design; it could be "top hat" shape if desired. Access to the nut and bolt arrangement 8 is from the front of the raceway through the gap 9 incorporated between the ends of the adjacent straight elements. The ends of the straight elements, in addition to being radiused, are bell-mounted, i.e., flared at 10 to prevent cables being snagged by sharp edges.

Figure 1:
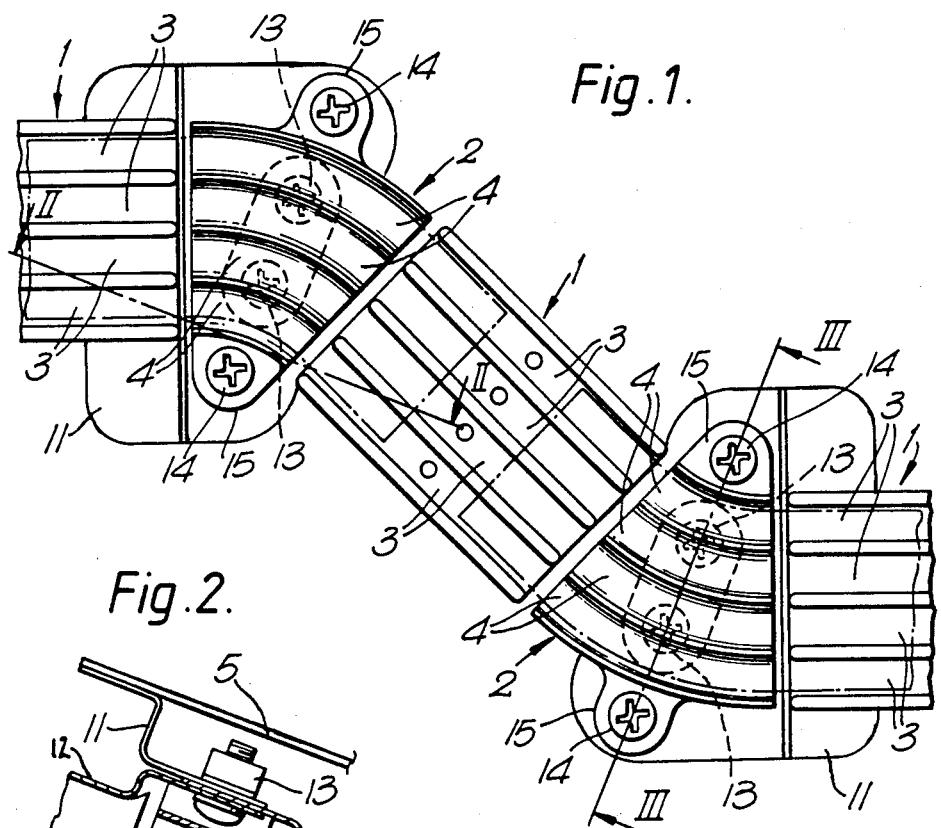
FIG. 1 is a plan view of a portion of a conduit system.
Figure 2:
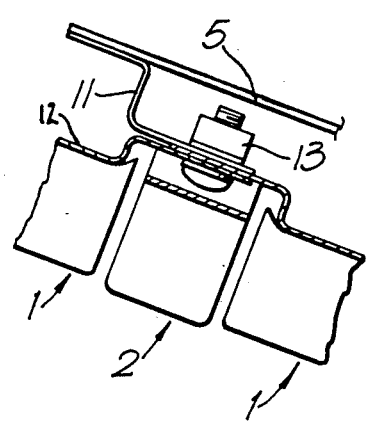
FIG. 2 is a section on line II—II of FIG. 1.
Figure 3:
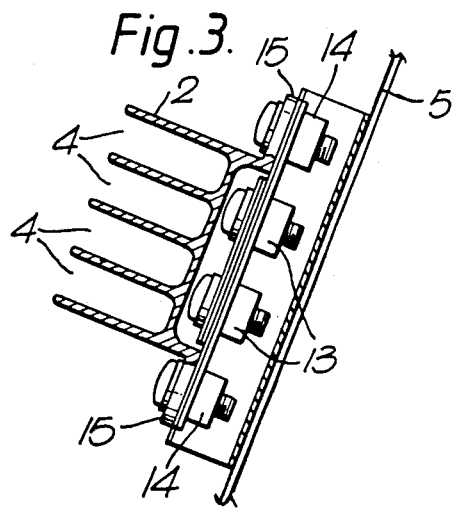
FIG. 3 is a section on line III—III of FIG. 1.
Figure 4:
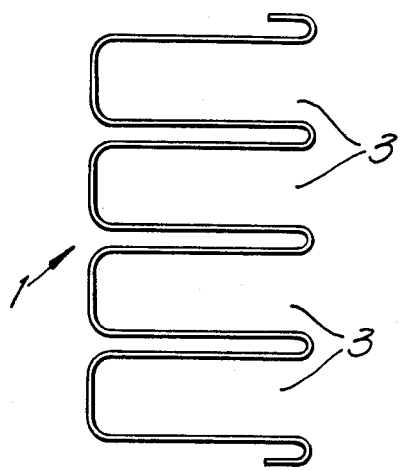
FIGS. 4 and 5 are end views of typical conduit elements.

Reverting to FIGS. 1–3, mounting arrangements are shown for the interconnecting regions between the curves at the straight elements. Again a bracket 11 of Z-section projects from the aircraft structure 5. Each straight element has a mounting lug 12 extending from its end and is coupled to the bracket 11 by means of two nut and bolt arrangements 13. Access to these nut and bolt arrangements is with the curved element removed; again access is from the front. The curved elements are attached to the bracket 11 by means of similar nut and bolt arrangements 14 lying on wings 15 positioned one to each side of the raceway itself. The nut and bolt arrangements 14 are thus accessible from the front.

Referring again to FIGS. 6–8, which show cables 16 in place in the raceway, means are now described by which these cables are actually held in place. Such means comprise retention units positioned at spaced intervals along the straight elements. Each retention unit includes two members, one is a cable retaining member of block-like form whilst the other is a locking member designed to hold the cable retaining member in a cable retaining position. Each retaining member is in the form of a plastic block 18 which is a pushfit into each channel and closely engages the internal flanks of its associated channel. Whilst it would be possible to ensure that the mere engagement of the block with the flanks of its associated channel would be sufficient to hold the block in its cable retention position, particularly if the flanks of the channels were provided with serrations engagable by ratchet means on the block, it is found that more conveniently the locking member can be in the form of a tie member 19 which projects from a central region of the base of a channel outwards into the channel. Each tie member can be formed of a resilient plastic material of a strip-like form with a series of serrations 23 along its flanks. In this case each block 18 has an aperture through its centre through which the tie member extends, the aperture being provided with ratchet means integrally formed with the block to resiliently engage and interlock with the serrations on the tie member in such a way that once the block is inserted it is locked in place and cannot be removed without a special tool. Again, insertion is from the front. The tie member 19 may merely have anchorage means at one end which allows the tie member itself to protrude through a specially fromed aperture in the base of the channel and the anchorage means engages with the base of the channel, in which case insertion would require to be from the rear of the raceway. Alternatively, and as illustrated in FIG. 13, the tie member 19 may have a spear or harpoon shaped arrangement at its anchorage end which allows insertion from the front of the raceway and also prevents easy removal.

In FIGS. 9, 9A, 10 and 10A two examples of the blocks 18 are illustrated, that of FIGS. 9 and 9A being suitable for small width channels, and that of FIGS. 10 and 10A being suitable for larger width channels. In each case the ratchet means, integrally formed with the block, is illustrated at 20.

The cable holding capacity of a channel can be arranged such that the cable retaining block 18 lies flush with the channel mouth when the channel is full. The block is accordingly sized so that this can take place. Indeed, the cable holding capacity may be arranged to be, say, 10% greater than that initially required so that extra cables can be added. This extra capacity is shown in chain lines in FIGS. 11 and 12 for reference only. As further illustrated in FIGS. 11 and 12, fairlead blocks can be inserted in the channel and held in by means of the blocks 18. Those fairlead blocks reference 21 have apertures therein so that further cables can be passed through them and introduced into the channel as required. Those referenced 22 have openmouthed slots therein to accommodate the cables, the slots being closed by the walls of the channels 3 as the fairlead blocks are urged in and held by the blocks 18. This is a preferred arrangement since it facilitates the slipping in and out of cables during modifications to the cable runs. In yet a further embodiment, not illustrated, the fairlead blocks are incorporated into the retaining blocks 18 to provide a dual purpose block which performs both fairlead and retaining functions.

It is found that the depth of the channels provides sufficient screening to prevent adverse interaction between cable runs.

Referring briefly to FIG. 14 this illustrates, as an alternative embodiment, a further typical conduit element of extruded cross-sectional form provided with a plurality of channels 3. As in the case of the conduit element previously described, the interior of each channel is coated with PTFE to give both insulation and a low friction characteristic whilst additionally assisting in the avoidance of chaffing.

We claim:

1. A conduit system, especially for mounting cables in a vehicle, said conduit system including at least three conduit elements, each having an equal multitude of channels for holding cables, positioned in end to end relationship such that the channels of each conduit element lie substantially in alignment with the channels of the adjacent conduit element and the end of each conduit element lies closely adjacent to but set apart from its adjoining conduit element, at least two of said conduit elements being straight and at least one being curved, and two or more straight conduit elements being interconnected by one or more curved conduit elements, the channels of the curved conduit elements being of slightly greater width than the channels of the straight conduit elements, and the ends of the straight conduit elements being slightly flared to effect a smooth transition between the channels of adjacent conduit elements.

2. A conduit system according to claim 1 further having a cable retention means in each channel of the straight conduit elements for retaining cables at intervals along their lengths when installed therewithin, each cable retention means comprising a cable retaining member dimensioned to be a push fit within its associated channel and a locking member in the form of an elongated tie member secures within the associated channel, said tie member having a series of serrations along its length, and said cable retaining member having an aperture therethrough for receiving said tie member and also having means for engaging and interlocking with the serrations of the tie member, the arrangement being such that, in use, the cable retaining member imparts a retaining force on cables when installed in the associated channel and the tie member engages with the cable retaining member and locks it in place.

3. A conduit system according to claim 1 in which each cable retaining member comprises a fairlead block having at least one cable passageway therethrough.

* * * * *